United States Patent [19]

Pearson

[11] 3,905,778

[45] Sept. 16, 1975

[54] MIRROR WITH OPTICALLY POLISHED SURFACE

[75] Inventor: Robert C. Pearson, Annapolis, Md.

[73] Assignee: Westinghouse Electric Corporation, Pittsburgh, Pa.

[22] Filed: Aug. 1, 1973

[21] Appl. No.: 384,655

[52] U.S. Cl............................ 29/191; 29/195
[51] Int. Cl.² .... B23P 3/00; B32B 3/00; C25D 7/08
[58] Field of Search ............. 161/4; 204/19, 7; 29/191.4, 191; 117/35 R; 350/292, 320

[56] References Cited
UNITED STATES PATENTS

| | | | |
|---|---|---|---|
| 1,394,085 | 10/1921 | Halvorson, Jr. ..................... 204/7 |
| 1,535,916 | 4/1925 | Halvorson, Jr. ................... 204/7 X |
| 3,170,471 | 2/1965 | Schnitzer ....................... 350/292 X |
| 3,286,270 | 11/1966 | Kelly ............................. 350/292 X |
| 3,316,158 | 4/1967 | Du Pree et al. ....................... 204/7 |
| 3,378,469 | 4/1968 | Jochim ................................. 204/7 |
| 3,577,323 | 5/1971 | Pichel ................................. 204/7 |
| 3,600,257 | 8/1971 | Reinhardt .............................. 161/4 |

Primary Examiner—L. Dewayne Rutledge
Assistant Examiner—O. F. Crutchfield
Attorney, Agent, or Firm—D. Schron

[57] ABSTRACT

A method is disclosed for reproducing a duplicate having a mirror optical surface from a master optical surface. In particular, a master is produced by conventional methods such as deposition and grinding to provide an optical surface. Next, a nonadhering layer of a reflective material is applied to the optical surface of the master, which may be used repeatedly. An adhesive is applied over the nonadhering layer and a suitable base structure is pressed into the adhesive. When the adhesive has been cured, the base, and adhesive and nonadhering layers are removed. The resulting surface of the nonadhering layer is a precise replica of the optical surface of the master.

4 Claims, 10 Drawing Figures

MIRROR WITH OPTICALLY POLISHED SURFACE

BACKGROUND OF THE INVENTION

1. Field of the Invention

This invention relates to a method of producing an optical surface and more particularly to such a method of producing an optical surface from a master optical surface.

2. Description of the Prior Art

Optical surfaces have been manufactured in the prior art by depositing a layer of a suitable reflective material upon a base and subsequently machining and polishing the deposited layer until the desired optical surface is provided. One of the problems associated with such methods is the expense encountered in machining and polishing to achieve the optical surface.

Further, there recently has been developed optical systems that require relatively large, light-weight mirrors to be adjustably oriented by gimbaled mountings. In order to reduce the weight of such mirrors, a honeycomb structure is coated with electroless nickel and then, the nickel surface is ground and polished to the required optical finish. The successful completion of such a mirror has been hampered by problems encountered in electroless nickel deposition and in the subsequent grinding and polishing. In addition to the expense of grinding and polishing as mentioned above, these last two steps create mechanically induced stress bonds as well as stress bonds caused by a thermal gradient established across the honeycomb substrate contributing to possible distortion in the mirror surface.

SUMMARY OF THE INVENTION

It is therefore an object of this invention to provide a relatively inexpensive method of manufacturing an optical surface without grinding or polishing a base structure.

It is a further object of this invention to provide a process of producing an optical surface on such lightweight base structures such as a honeycomb wherein thermal equilibrium is maintained throughout the manufacturing process.

It is a more particular object of this invention to utilize a master having an optical surface from which many duplicates may be produced thereby yielding an economic advantage over individual mirror grinding and polishing processes.

In accordance with these and other objects of this invention, there is provided a method of reproducing duplicate mirrors having an optical surface from a master. In particlar, a master first is produced having an optical surface of the required flatness. Next, a nonadhering layer of a suitable reflective material and a layer of a suitable adhesive material are applied successivley to the master. A suitable base structure then is pressed into the adhesive and after curing, the base structure and the nonadhering and adhesive layers are removed in one piece. The now-exposed surface of the nonadhering layer is a precise replica of the master, and the master may be reused repeatedly.

In a further feature of this invention, the nonadhering layer is so deposited on the master to present a roughened surface whereby a secure bond may be formed between the nonadhering layer and the adhesive layer. By constrast, the surface of the nonadhering layer formed against the optical surface of the master does not adhere to the master to permit ready separation of the combination of the nonadhering and adhesive layers and the base structure from the master.

In an illustrative embodiment of this invention, the master is formed of a suitable stainless steel which is passivated, whereby the layer of reflective material may be readily removed therefrom. In order to provide the desired roughened surface, granular particles of material are mixed into that portion of the nonadhering layer remote from the master.

BRIEF DESCRIPTION OF THE DRAWINGS

These and other objects and features of the invention will become apparent from the following detailed description taken in conjunction with the accompanying drawings which form a part of the specification, and in which.

DESCRIPTION OF THE PREFERRED EMBODIMENTS

Figure 1A:
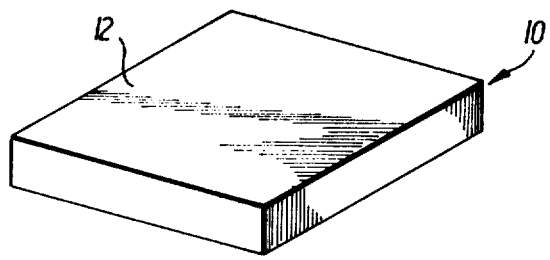
FIGS. 1A–1H show successively the steps in accordance with the method of this invention by which a duplicate is formed having an optical surface corresponding to that of the master.

With regard to the drawings and in particular FIGS. 1A–1H, an illustrative method in accordance with teachings of this invention will now be explained. In FIG. 1A, there is shown a master flat 10 of a suitable substance such as 302 stainless steel capable of being optically polished to form an optical surface 12. The master flat 10 is polished by conventional techniques and a measurement of its flatness may be made by interferometry using a three-inch diameter optical flat surface plate and a monochromatic fluorescent helium light. Illustratively, the surface 12 was polished to an optical flatness of two fringes, as measured by the above-described technique. As will be explained in detail later, the duplicate to be manufactured in accordance with the method of this invention is capable of reproducing precisely the optical flat surface of the master, i.e., the reproduced optical surface was measured to have a flatness of two fringes.

Figure 1B:
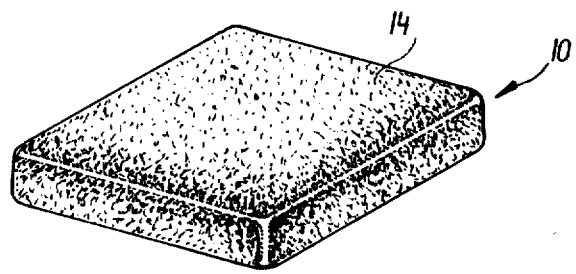

In the next step as illustrated in FIG. 1B, a layer 14 of a suitable material capable of reproducing the optical flatness of the master 10 and yet not adhering to the master 10, such as nickel, is deposited about the entire surface of the master 10. In an illustrative example of this invention, the coating of the stainless steel master is carried out as follows. First, a vapor degrease is effected by heating a suitable solvent such as trichloroethylene to its vaporization point whereby a vapor of the solvent condenses on the master flat 10. Next, the master flat 10 is cleaned in an alkaline cleaning solution maintained at approximately 70°C to remove any inorganic material from the optical surface 12. Next, the clean master 10 is passivated in a 25% solution of nitric acid in deionized water whereby the surface 12 becomes passive to most chemical reactions to present thereby a nonadhering surface 12 to a layer 14 to be deposited in a manner to be explained. After passivating, the surface 12 is alkaline-cleaned until a water break-free surface is obtained. Without allowing the surface to dry, the master 10 is immersed in a Watts nickel electroplating solution and plated for 1 hour at 15 amps per square foot to provide the layer 14 of nickel over the entire surface of the master 10, as shown in FIG. 1B. Under such illustrative conditions, a layer of approximately .8 mil was deposited upon the master 10.

Figure 3:
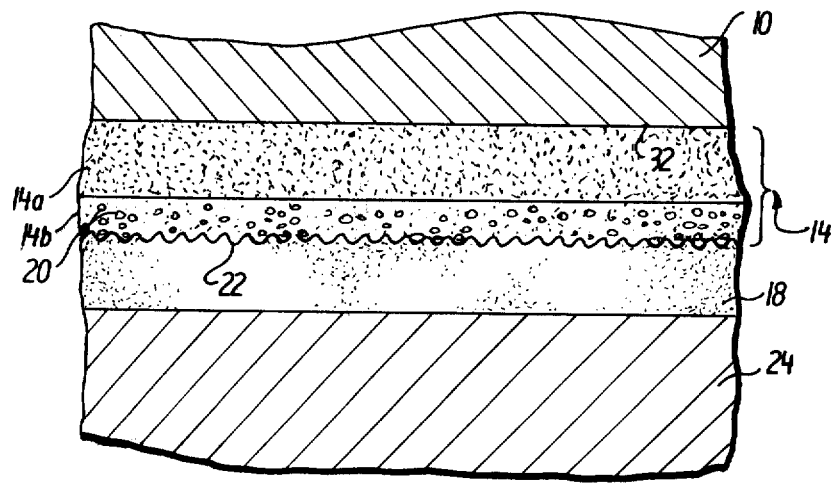
FIG. 3 shows a sectioned-in-part view of the master, the layers of adhesive and reflective material, and the base structure.

With regard to FIG. 3, it is seen at this point in the method that only the sublayer 14a of nickel is formed on the master 10. Immediately after plating in the Watts nickel solution, the master 10 is immersed in a second plating bath to form the second portion or sublayer 14b as shown in FIG. 3. In particular, the master 10 is disposed in a small tank of a standard Watts nickel plating solution having a prescribed quantity of particulate matter. The particulate matter is selected of a substance having the property of an inert reaction with the electroplating solution, to provide thereby a roughened surface 22 upon which an adhesive layer 18 may be securely bonded. In one illustrative embodiment of this invention, 10% by weight of 300-grit silicon carbide powder is added to a standard Watts nickel plating solution. A mechanical stirrer is used to keep the carbide particles suspended in the electrolyte, and nickel anodes are suspended in the bath while proper solution temperature is maintained. The r.p.m. of the mechanical stirrer is adjusted to suspend the carbide particles within the electrolyte. With a current density of approximately 15 amps/sq. feet, the master 10 is plated for approximately 20 minutes. During this period, carbide particles 20 are included within the nickel deposit. As can be seen in FIG. 3, the purpose of the two separate plating baths permits first a deposition of a smooth, continuous sublayer 14a over the optical surface 12 of the master 10 exactly matching the master. The silicon carbide modified Watts nickel bath provides the surface 22 that looks and feels like sandpaper to optimize the bond between the nonadhering layer 14 and the layer 18 of adhesive.

Figure 1C:
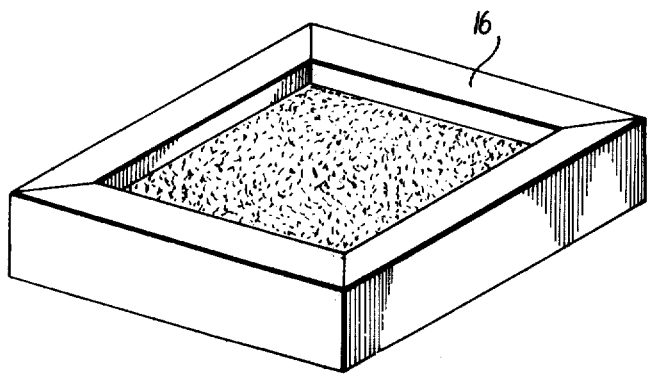

After plating, the master 10 is rinsed thoroughly in water and blown dry. Next, the master 10 is placed into a casting mold 16 as shown in FIG. 1C.

After positioning the coated master 10 into the casting mold 16, a suitable adhesive is applied in a thin, continuous and void-free layer 18 over the roughened surface 22 of the nonadhering layer 14. The choice of a suitable adhesive formulation is based upon the following criteria. First, the adhesive material should have a minimum curing shrinkage for exact duplication of the optical surface 12 and to prevent a possible "orange peel" effect in the reproduced optical surface 32. Secondly, the adhesive material should have a low curing exotherm and low curing temperature for minimized heat distortion during the reproduction process. If a relatively large temperature excursion was required to achieve curing, stresses would be induced between the deposited layer 14 and a base structure 24 to which it is to be attached by the adhesive layer 18; as a result, distortions would be introduced into the reproduced optical surface 32 of the layer 14. Further, the adhesive material should have a thermal expansion coefficient closely matching that of the layer 14 and the base structure 24 so that as the composite reproduced mirror is subjected to changes of temperature, the distortion induced by stresses will be minimized. In addition, the adhesive material should have a relatively low viscosity to aid in the elimination of air bubbles and to facilitate the application of a thin, continuous adhesive layer.

In one illustrative embodiment of this invention, an adhesive system was selected as provided by the Hysol Division of the Dexter Corporation and comprising an epoxy casting compound under the designation of TC—9—4353 and a corresponding Hysol hardener 3426. In particular, 100g of the noted resin is weighed out and heated in an oven at approximately 50°C for approximately 30 minutes, to improve the flow properties of the adhesive layer 18. Next, the noted resin is placed into a vacuum chamber and evacuated for approximately 15 minutes to remove possible air bubbles within the adhesive material. The resin is heated again in the 50°C oven for 15 minutes to replace the heat lost in the previous vacuum exposure step. Then, a measured amount in the order of 10% by weight of the Hysol 3426 hardener, e.g. approximately 10g thereof, is added to the noted resin and carefully mixed in a manner to minimize air entrapment. The above-noted quantities of resin and hardener were sufficient to cover completely a master flat 10 approximately 4 inches × 3 inches in dimension. It has been found that the percent of hardener effects the coefficient of expansion and curing shrinkage of the adhesive layer 18. Varying percentages of hardener, including 10%, 12% and 15%, were tested, and 10% of the hardener was found to provide an optimum coefficient expansion and a minimum curing shrinkage. Below 10% of the hardener, complete curing would not be achieved.

Figure 1D:
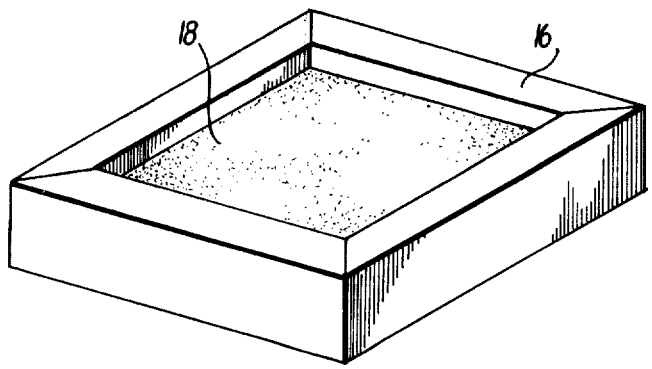

The catalyzed resin then is evacuated for 10 minutes and thereafter removed from the vacuum chamber. As illustrated in FIG. 1D, the mixed resin then is carefully poured into the casting mold 16 and allowed to flow over the layer 14 to provide the thin, continuous layer 18 of adhesive. In an illustrative embodiment of this invention, a layer 18 of adhesive was poured to a thickness of approximately .030 inch.

Figure 1E:
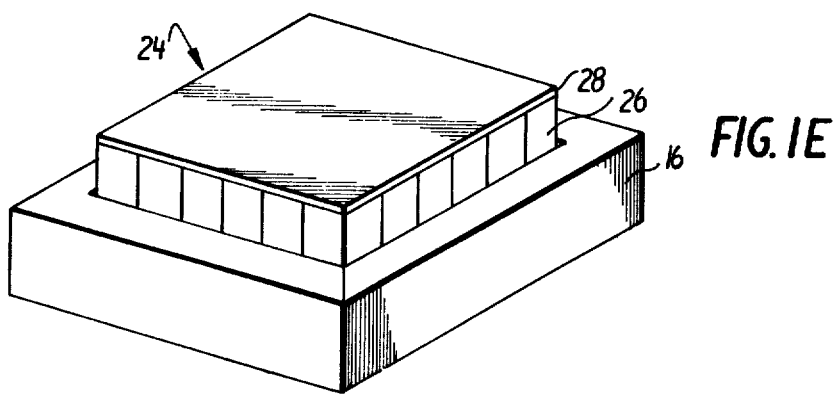

In the next step, as shown in FIG. 1E, the base structure 24 is pressed into the adhesive layer 18. In an illustrative embodiment of this invention, the base structure 24 may take the form of a honeycomb made of beryllium surface sheets bonded to a stainless steel honeycomb core made by Rohr Corporation. Other base structures 24 may be used, including a solid base structure or a honeycomb structure made of such materials as beryllium, aluminum or advance composites. In the illustrative embodiments shown in FIGS. 1E–1H, the base structure 24 illustratively includes a honeycomb-type core section 26. One edge of the base structure 24 is placed into the adhesive layer 18 and slowly pressed so as to rotate about that edge into the casting mold 16, whereby the resin is displaced in a manner to avoid air entrapment. The base structure 24 is continued to be pressed into a position approximately parallel to the surface 12 of the master 10, resulting in a relatively thin adhesive layer 18 in the order of 2–3 mils disposed between the base structure 24 and the nickel coated master 10. Thereafter, the adhesive is permitted to cure at room temperature for a minimum of 8 hours before additional processing.

Figure 1F:
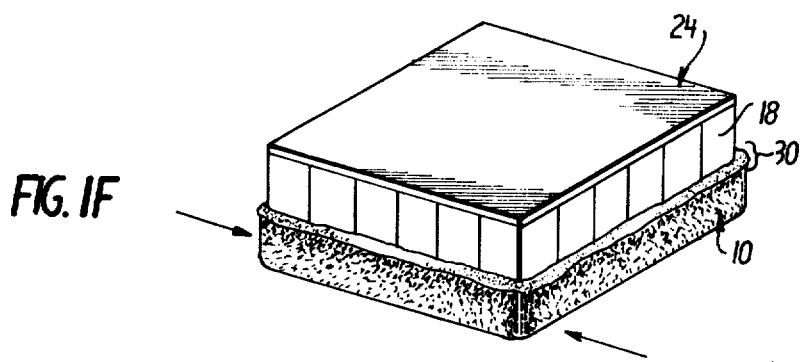
Figure 1G:
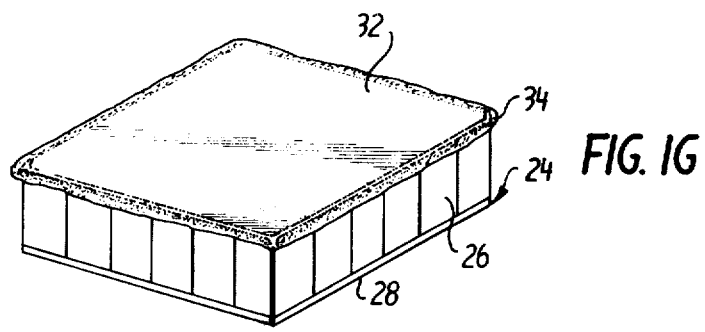
Figure 2:
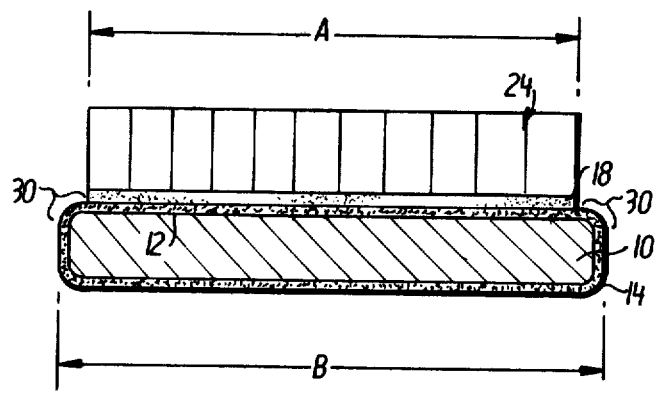
FIG. 2 shows a cross-section of the master and the base structure.

As seen in FIG. 1F, the casting mold 16 then is removed after the adhesive layer 18 has fully cured. Then, a peripheral portion 30 is scribed as shown in FIGS. 1F and 2, thereby removing this portion of the deposited layer 14. Next, the composite of the base structure 24, and the layers 14 and 18 of nickel and adhesive is removed from the master 10. Even though the optical surface 12 of the master 10 has been passivated to ensure that the layer 14 does not adhere thereto, a vacuum tends to form between the optical surface 12 of the master 10 and the reproduced surface 32 of the layer 14, tending to hold these two members together. To release this vacuum, a sufficient force is established on opposite sides of the master 10 as shown by the arrows in FIG. 1F, to impart a convex deflection in the order of 1–2 mils to the master 10. Upon deflection of the master 10, it may be removed readily from the reproduced mirror member as shown in FIG. 1G. In an illustrative embodiment of this invention, the deflection forces are applied to the master 10 by a vice-type device having a screw-type mechanism which is tightened to the desired degree to achieve master deflection. As shown in FIG. 2, the lengthwise dimension B of the master 10 is greater than the dimension A of the base structure 24, whereby the deflection forces may be applied readily to the master 10 without damaging the base structure 24 and the peripheral portion 30 of the layer 14 may be removed as described above.

Figure 1H:
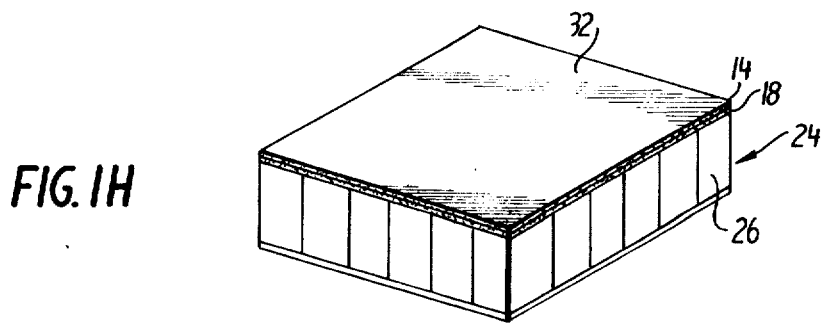

Next, as seen in FIG. 1G, the edges of the layers 14 and 18 of adhesive and nickel are trimmed to provide the finished, reproduced mirror as shown in FIG. 1H. If desired, a different reflective surface may be provided upon the reproduced optical surface 32 by the vapor deposition of a suitable reflective material such as silver with a protective overcoat of silicone monoxide (SiO). Layers of aluminum and silicon monoxide may be vapor depositied in place of silver depending upon optical system end use.

In addition to the reflective materials mentioned above of which the layer 14 may be composed, copper could be electroplated upon the master 10 to form the layer 14. Further, Nichrome may be vapor deposited to the desired depth upon the master 10 made of glass at standard temperatures and degree of vacuum and then passivated as described above. Further, suitable diluent(s) such as Freon 11 may be added during the mixing of the adhesive before the hardener or catalyst is added, to lower the viscosity whereby air bubbles may be removed more easily from the adhesive layer 18. Further additives such as Zerifac, a lithium silicate powder produced by Foote Mineral Company, having a low thermal expansion rate may be mixed into the epoxy to adjust its coefficient of thermal expansion to be more nearly equal to that of the base structure and the nonadhering layer 14.

Thus, there has been described above a method for reproducing the optical surface of a master whereby the master may be reused repeatedly without the need for expensive polishing and machining of each reproduced mirror.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A mirror element comprising:
   a. a base structure;
   b. a first layer of a suitable reflective material having a first optically flat surface and a second surface rough with respect to said first surface; and
   c. a second layer of adhesive material for securing said first layer of reflective material to said base structure, said adhesive material having a coefficient of thermal expansion sufficiently similar to that of said base structure and said first layer to prevent stresses from distorting said first optically flat surface;
   d. said first layer including a plurality of solid particles dispersed in said first layer adjacent said second, rough surface and being of sufficient size to provide said second surface with a roughness whereby said first layer adheres to said second layer.

2. The mirror element as claimed in claim 1, wherein said solid particles comprise silicon carbide.

3. The mirror element as claimed in claim 1, wherein the first layer of reflective material includes a first layer portion forming said first surface and comprising said reflective material, and a second layer portion forming said second surface and having a plurality of said solid particles dispersed in said reflective material of increasing density as said second surface thereof is approached.

4. The mirror element as claimed in claim 1, wherein said base structure comprises a honeycomb-type core.

* * * * *